(12) United States Patent
Lee

(10) Patent No.: US 6,184,298 B1
(45) Date of Patent: Feb. 6, 2001

(54) ADHESIVE COMPOSITIONS BASED ON BLENDS OF GRAFTED POLYETHYLENES AND NON-GRAFTED POLYETHYLENES AND STYRENE CONTAINER RUBBER

(75) Inventor: I-Hwa Lee, Wilmington, DE (US)

(73) Assignee: E. I. du Pont de Nemours and Company, Wilmington, DE (US)

( * ) Notice: Under 35 U.S.C. 154(b), the term of this patent shall be extended for 0 days.

(21) Appl. No.: 09/334,329

(22) Filed: Jun. 16, 1999

Related U.S. Application Data

(60) Provisional application No. 60/089,855, filed on Jun. 19, 1998.

(51) Int. Cl.[7] ............................ C08L 23/00; C08L 23/04; C08L 25/02
(52) U.S. Cl. ..................... 525/240; 525/241; 156/327; 156/334; 428/474.4; 428/476.3; 428/500; 428/515
(58) Field of Search ............................. 525/191, 240, 525/241; 156/327, 334; 428/474.4, 476.3, 500, 515

(56) References Cited

U.S. PATENT DOCUMENTS

| | | | |
|---|---|---|---|
| 3,868,433 | 2/1975 | Bartz et al. | |
| 4,058,647 | 11/1977 | Inoue et al. | |
| 4,198,327 | 4/1980 | Matsumoto et al. | |
| 4,298,712 | 11/1981 | Machonis, Jr. et al. | 525/74 |
| 4,332,858 | 6/1982 | Saitoh et al. | 428/412 |
| 4,341,837 | 7/1982 | Katsuto et al. | 428/336 |
| 4,562,230 | 12/1985 | Fukui et al. | 525/74 |
| 4,675,471 | 6/1987 | Shida et al. | 174/36 |
| 4,684,576 | 8/1987 | Tabor et al. | 428/441 |
| 4,684,578 | 8/1987 | Inoue et al. | 428/462 |
| 5,021,113 | 6/1991 | Sanders et al. | 156/334 |
| 5,039,565 | 8/1991 | Deyrup | 428/35.7 |
| 5,104,733 | 4/1992 | Kasakevich et al. | 428/332 |
| 5,198,494 | 3/1993 | Kawachi et al. | 525/71 |
| 5,225,482 | 7/1993 | Nakagawa et al. | 525/71 |
| 5,250,349 | 10/1993 | Nakagawa et al. | 428/212 |
| 5,256,226 | 10/1993 | Marzola et al. | 156/95 |
| 5,346,963 | 9/1994 | Hughes et al. | 525/285 |
| 5,369,174 | 11/1994 | Hasselbring | 525/71 |
| 5,439,974 | 8/1995 | Mattson | 525/71 |
| 5,523,358 | 6/1996 | Hirose et al. | 525/244 |
| 5,525,421 | 6/1996 | Knoerzer | 428/347 |
| 5,525,672 | 6/1996 | Jones | 525/80 |
| 5,591,792 | 1/1997 | Hattori et al. | 524/271 |
| 5,643,999 | 7/1997 | Lee et al. | 525/193 |
| 5,705,565 | 1/1998 | Hughes et al. | 525/65 |
| 5,709,953 | 1/1998 | Goto et al. | 428/474.4 |

FOREIGN PATENT DOCUMENTS

| | | |
|---|---|---|
| 0405789 | 1/1991 | (EP) . |
| 0412503 | 2/1991 | (EP) . |
| 0738589 | 10/1996 | (EP) . |
| 2-252747 | 10/1990 | (JP) . |
| WO 97/27259 | 7/1997 | (WO) . |

*Primary Examiner*—Nathan M. Nutter
(74) *Attorney, Agent, or Firm*—Kevin S. Dobson

(57) ABSTRACT

The invention relates to adhesive compositions having a modified polyethylene; an unmodified polyethylene of a certain density and a styrene-based elastomer. The styrene-based elastomer is present in a weight percentage of 10 to 45 wt. percent relative to the total weight of the elastomer plus the modified and unmodified polyethylenes. The adhesive composition is particularly useful in multilayer composite structures having polypropylene as one substrate and having bonded thereto a polyethylene or a layer which is made from an ethylene copolymer such as an ethylene/acid copolymer or an ethylene acid ionomer. In addition, the adhesive composition is particularly useful in multilayer structures having five layers wherein a single adhesive composition is needed as layer two and four and the other structural layers are, for example, polyethylene/ nylon/polypropylene or similar structures which would heretofore require two different polyolefin based adhesives.

16 Claims, No Drawings

ADHESIVE COMPOSITIONS BASED ON BLENDS OF GRAFTED POLYETHYLENES AND NON-GRAFTED POLYETHYLENES AND STYRENE CONTAINER RUBBER

This application claims the benefit of U.S. Provisional Application No. 60/089,855, filed Jun. 19, 1998.

BACKGROUND OF THE INVENTION

1. Field of the Invention

This invention relates to adhesive compositions, particularly co-extrudable adhesives, suitable for complex composite structures, such as those having multiple barrier and structural layers which are typically incompatible with each other. The adhesive compositions are blends of acid-grafted polyethylene and unmodified polyethylene and styrene butadiene rubber.

2. Discussion of Related Art

Co-extrudable adhesives based on blends of various polyethylenes which also contain an acid-grafted polyolefin to aid in adhesion to polar layers are well known.

U.S. Pat. No. 3,868,433 discloses polyolefins generally, graft-modified with acids, and which may also contain elastomers, for use as hot-melt adhesives.

U.S. Pat. No. 4,684,576 discloses adhesive blends based on acid-grafted high density polyethylene, and linear low density polyethylene of density 0.88 to 0.935.

U.S. Pat. No. 4,058,647 discloses blends of modified and unmodified polyolefins with a rubber component having 40–150 of Mooney viscosity 50 ML 1+4 at 100° C. There is no teaching of elastomeric components having immeasurable Mooney viscosities under these conditions for blending with the polyolefins nor is there a specific example which shows or describes the use of a styrene based elastomer.

U. S. Pat. 4,198,327 discloses compositions of graft modified crystalline polyolefins (optionally mixed with ungrafted crystalline polyolefins) and a hydrocarbon elastomer as having improved adhesion to polar solid materials. While styrene butadiene rubber is generically disclosed-there is no specific teaching in the examples of the use of a styrene based elastomer.

EPO 412 503 A2 discloses a multitude of adhesive resin compositions and multilayer structures containing the adhesives. An adhesive composition of a second embodiment as disclosed therein relates to a composition having 100 parts by weight of a soft polymer and 1 to 30 parts by weight of partially or wholly grafted modified polyethylene in which a grafting amount of an unsaturated carboxylic acid or a derivative thereof is 0.05 to 15% by weight, the soft polymer comprising (a) 20 to 100% by weight of a styrene elastomer and (b) 80 to 0% by weight of an ethylene/alpha-olefin copolymer having an ethylene content of 45 to 95 mole %. Example 5 in this publication describes the use of 100 parts by weight ("pbw") of a stryene based elastomer and 10 pbw of maleic anhydride grafted polyethylene wherein this adhesive is layered between polycarbonate/EVOH/PP. Example 6 of this publication describes the use of 75 pbw of a styrene elastomer; 25 pbw of an ethylene/propylene random copolymer and 10 pbw of a maleic anhydride grafted PE and a multilayer structure similar to above or comprising PET/EVOH/PP with the adhesive between each internal layer-i.e., where the / is. This patent clearly specifically shows that a large percentage of styrene elastomer is necessary in the adhesive composition in spite of generic teachings which may suggest otherwise. In addition, the density of the unmodified ethylene-alpha olefin utilized therein in the blend with the styrene elastomer to form the soft polymer composition must be 0.850 to 0.900 g/cm. See also, U.S. Pat. Nos. 5,225,482 and 5,250,349.

U.S. Pat. No. 5,591,792 discloses adhesive compositions containing styrene-butadiene elastomers wherein the composition requires a tackifier as a key excipient.

U.S. Pat. 5,643,999 discloses mixtures of polyethylenes and certain elastomers wherein the blend may be modified or unmodified and wherein the adhesives are used to bond ionomer structural layers to barrier layers. This patent requires the use of at least two different polyethylenes with two distinct (non-overlapping) density ranges. No specific examples describe the use of a styrene based elastomer even though they (among other hydrocarbon elastomers with certain heats of fusion) are generically disclosed as comprising 5–30% of the composition. The present invention, on the other hand, requires that the styrene based elastomer is unmodified. In addition, the '999 patent teaches that no polyethylenes of density greater than 0.935 can be present in the composition.

U.S. Pat. No. 4,298,712 discloses adhesive blends having elastomers, grafted high density polyethylene and polyethylene resin(s). The grafting reagent selected to graft to the high density polyethylene is selected from unsaturated fused ring carboxylic acid anhydrides. This compounds must contain one or more carbocyclic or other ring moieties not including the anhydride ring.

It is also known that polyolefins, such as polyethylene and polypropylene, are widely used as packaging materials because of their good mechanical strength, water resistance and organoleptic properties. Because of their high permeability to gases, such as oxygen and carbon dioxide, etc., such polyolefins are frequently combined with polar polymers with excellent barrier properties, such as ethylene vinyl alcohol polymers and polyamides, to form a composite structure with desirable properties.

Such composite structures are held together by acid modified extrudable adhesives. It is a relatively simple matter to select such adhesives when the composite structure contains very similar structural layers. A structure comprising of polypropylene and EVOH or polypropylene and nylon can easily be bound together with a acid modified polypropylene adhesive. Similarly, a structure of polyethylene and EVOH can be bonded together with an acid-modified polyethylene adhesive. It becomes a more complicated matter when the composite structure contains different structural layers. For example, with a composite film of polyethylene/nylon/polypropylene, one could use an acid-modified polyethylene adhesive to bond the polyethylene layer to the nylon layer and an acid-modified polypropylene adhesive to bond the polypropylene layer to the nylon layer. This could be highly inconvenient to the converter since it would necessitate the use of two separate adhesive extruders rather than a single adhesive extruder. Alternatively, the fabricator could use an acid modified ethylene vinyl acetate or ethylene methyl acrylate adhesive to bond both polypropylene and polyethylene layers to the nylon layers. However, such adhesives are well known to impart odor and taste to packaged foods; thus, the excellent organoleptic properties of the composite structure are compromised.

In another example, a composite structure of polypropylene, EVOH and ethylene ionomer cannot be bound well together by a single acid modified polyethylene or polypropylene adhesive and the converter, again, must resort to either using both adhesives or to an acid modified ethylene vinyl acetate or ethylene methyl acrylate adhesive.

It is an object of this invention, therefore, to provide a polyolefin based adhesive composition that can be used to bond polypropylene as part of at least a three-layer multilayer structure to ethylene polymers, such as polyethylene, ethylene acid copolymers and ethylene acid ionomers without requiring two different adhesives while also able to bond similar substrates through an intervening barrier layer such as polypropylene/nylon/polypropylene. In addition, the compositions of the invention do not require a separate tackifier as an essential ingredient and in some embodiments, as compositions and in certain multilayer structures having said compositions, ethylene-alpha olefins having a density of less than or equal to 0.900 g/cm3 are excluded. The inventors have found that medium to high density unmodified polymers coupled with a combination of modified polymers and styrene based elastomers in certain relative weight percentages provides significant gains in adhesion properties. Surprisingly, the inventors have also found that the particular choice of elastomer in the adhesive blend has a significant effect on adhesive properties.

SUMMARY OF THE INVENTION

The present invention, therefore, provides an improved composition which consists essentially of
  A) about 55 to 85 wt % of a polyethylene polymer which is a combination of
    i) an unmodified polyethylene of density 0.86 to 0.97 g/cc
    ii) a polyethylene polymer of density 0.86–0.97 g/cc, modified with an unsaturated carboxylic acid or its derivative and
  B) about 15 to 45 wt % of an unmodified styrene-based elastomer having an immeasurable Mooney viscosity according to ASTM D15 under the test conditions ML 1+4 at 100° C. wherein said composition binds incompatible structural or barrier layers in a multilayer structural element having at least three structural/barrier layers. Alternatively, the unmodified polyethylenes, when selected from ethylene-alpha olefins should have a density of 0.91 to 0.97 g/cc.

The weight percentage of components A (i) and (ii) can vary between 0–99 wt. % of (i) and 100–1 wt. % of component (ii), provided that the amount of unsaturated acid or its derivative comprises 0.03 to 2% by weight of the total bonding resin composition of A+B. The preferred weight percentage of component B) is about 15–40 wt. % based upon the total weight of A+B.

The present invention also comprises a multilayered element comprising at least one substrate layer and the above adhesive compositions. In addition, the invention comprises multilayer composite structures in the form of sheets, bottles, metal composites and films. The layers may be coextruded or laminated. The invention comprises multilayer structures having, in order, at least one layer of a polypropylene, at least one structural or barrier layer and at least one layer of an ethylene based polymer selected from a polyethylene or ethylene copolymer or ionomer wherein the adhesive composition is between said layers to bond the layers together. For example, as discussed previously, these structures may include polypropylene/nylon/polyethylene or polypropylene/EVOH/ethylene copolymer ionomer. Of course, the adhesive compositions are also suitable in PP/barrier/PP or PP/PE structures.

DETAILED DESCRIPTION OF THE INVENTION

The unmodified polyethylene polymer referred to in the present invention denotes ethylene homopolymers and ethylene copolymers of alpha-olefins, such as but not limited to 1-butene, 1-hexene and 1-octene. These are commonly known as high density polyethylene (HDPE), low density polyethylene (LDPE), linear low density polyethylene (LLDPE) and, in some multilayer structures recited herein, very low density polyethylene (VLDPE) and ultra low density polyethylene (ULDPE). The polyethylenes of the invention may be utilized in the adhesive composition described herein or may be utilized as a structural layer component.

The density distinguishing abbreviations HDPE, LLDPE, VLDPE and ULDPE are used for 'linear' as distinct from highly branched (short and long chain) LDPE made by free-radical polymerization. Originally, before the advent of metallocene catalysts, the terms referred to resins made using Ziegler-Natta type catalysis. However, the terms are now often also used for resins made by metallocene catalysis as well.

In this disclosure where it is necessary to make the distinction, resins made by Ziegler-Natta type catalysis will be referred to as conventional-HDPE, conventional-LLDPE, conventional-VLDPE and conventional-ULDPE. Otherwise, it is understood that resins referred to as HPDE, LLDPE, VLDPE and ULDPE include resins manufactured by both Ziegler-Natta or metallocene catalysis.

Density ranges differ in the literature. Generally, the density ranges are: HDPE greater than 0.935 g/cc, LLDPE from greater than 0.91 to 0.935 g/cc and VLDPE and ULDPE from 0.85 to 0.91 g/cc. VLDPE is sometimes included as a subset in the category LLDPE, the density range for the latter going down to 0.85. To avoid confusion, resins at or below 0.91 g/cc will always be referred to as VLDPE. LDPE in this disclosure is free radical polymerized polyethylene having a density from 0.91 to 0.935 g/cc.

The LLDPE, VLDPE and ULDPE disclosed herein are produced by copolymerizing ethylene with alpha-olefin selected from the group consisting of butene-1, pentene-1, hexene-1, 4-methyl pentene-1, heptene-1, octene-1, etc. The density will depend on a large part on the amount and type of alpha-olefins used as the comonomer. Thus, HDPE may also contain small amounts of alpha-olefin as the comonomer. In the adhesive formulation recited herein as a formulation, the density of any ethylene-alpha olefin utilized as an unmodified polyethylene have a range of 0.86 to 0.97 g/cc or from 0.91 to 0.97 g/cc. As indicated above, when the invention comprises a multilayer structure having a polypropylene layer, an adhesive layer and an ethylene acid or ionomer layer or other multilayer structure as recited herein, the density of any ethylene-alpha polyolefin included therein as the unmodified polyethylene may range from 0.86–0.97 g/cc provided the other formulation limitations are met for the adhesive composition.

Metallocene polyethylenes are more uniform in various composition-related aspects than Ziegler-Natta polyethylenes. The molecular weight distribution is narrow compared with that of conventional-HDPE, conventional-LLDPE and conventional-VLDPE. Furthermore, the alpha-olefin comonomer is introduced in a far more uniform way, both along any given chain and from chain to chain, so that the short-chain branching distribution is narrow. In certain metallocene polyethylenes, it has been found possible to have a small amount of long-chain branching which, because of its uniform positioning along the polymer chains and from chain to chain, allows the molecular weight distribution to be narrow, yet changes the melt rheological behavior, typically making their flow more non-Newtonian over a large range of shear. Metallocene resins can thus be considered as being divided into two groups. The first group are those metallocene resins which contain either no or very low (as distinct from a small amount of) long-chain branching. The second group are those which are believed to contain a small amount of long-chain branching. This latter group corresponds roughly, but not precisely, to those using the same terminology as in U.S. Pat. No. 5,278,272. These groups can be distinguished from each other by two readily measurable parameters, the melt flow ratio and the Mw/Mn ratio. The first group are those which have a I-10/I-2 ratio of less than 6.53 together with an Mw/Mn of greater than (I-10/I-2)–4.63. The second group are those which have an I-10/I-2 ratio of equal or greater than 6.53 together with an Mw/Mn of equal or less than (I-10/I-2)–4.63. The invention, therefore, also relates to those adhesive compositions and multilayer structures having modified and unmodified metallocene polyethylenes or combinations of metallocene resins and non-metallocene resins (modified or unmodified).

The conventional polyethylenes can be prepared by well-known Ziegler-Natta methods (e.g., U.S. Pat. No. 4,076,698 and U.S. Pat. No. 3,645,992), catalysis in solution, slurry, gas phase or on a support. Metallocene resins may be made using conditions well known in the prior art for continuous polymerization, Ziegler-Natta or Kaminsky-Sinn type polymerization reactions. Suspension, solution, slurry, gas phase or other process conditions may be employed, if desired. A support may be employed, but preferably the catalysts are used in a homogeneous manner.

LDPE is produced by polymerizing ethylene at high pressures and high temperatures and using a free radical initiator, such as a peroxide. The polymer contains substantial amounts of long chain branching, where the branched chains, consisting of ethylene units of various lengths, are pendant of the main polymer chains or of other branched chains.

The unmodified polyethylene may be blends of one or more of the following groups: conventional polyethylenes, LDPE and metallocene polyethylenes and having the density range designations indicated above.

The modified polyethylene is a polyethylene resin, such as described for the unmodified polyethylenes above, which has been further modified with unsaturated carboxylic acids or its derivatives. The grafting monomer is selected from the group consisting of ethylenically unsaturated mono-, di- or polycarboxylic acids and ethylenically unsaturated carboxylic acid anhydrides, including derivatives of such acids or anhydrides. Acid grafting agents which are suitable include acrylic acid, methacrylic acid, maleic acid, fumaric acid, nadic acid, itaconic acid, crotonic acid, itaconic anhydride, maleic anhydride and dimethyl maleic anhydride. Examples of suitable derivatives include salts, amides, imides and esters of such acids or anhydrides. Among the acids or anhydrides, which are particularly useful, are maleic acid or maleic anhydride. The method of grafting onto the polyethylenes can be any of the processes well known in the art. For example, grafting can be carried out in the melt without a solvent, as disclosed in European Patent Application 0,266,994, or in solution or dispersion or in a fluidized bed. Melt grafting can be done in a heated extruder, a Brabender® or a Banbury® mixer or other internal mixers or kneading machines, roll mills and the like. The grafting may be carried out in the presence or absence of a radical initiator, such as a suitable organic peroxide, organic perester or organic hydroperoxide. The grafted polymers are recovered by any method which separates or utilizes the graft polymer that is formed. Thus, the graft polymer can be recovered in the form of precipitated fluff, pellets, powders and the like.

The art of grafting uniformly is well known, and the acid grafted resin should be as uniformly grafted as possible. The acid or anhydride groups generally comprise 0.005 to about 5 weight percent, preferably 0.01 to 3 weight percent, most preferably 0.05 to 3 weight percent of the modified polyethylene resin.

The term "unmodified" means that the polyethylene or the styrene-based elastomer does not have a grafting reagent such as those discussed above grafted to the base polymeric backbone.

The unmodified and modified polyethylene collectively comprise 55 to 85 percent by weight of the adhesive composition, preferably 60 to 80 percent by weight. The relative weight percentage ratios of unmodified to modified polyethylene ranges from 0 to 99 to 100 to 1%. It is understood that the graft modified polyethylene can but does not have to be the same resin as the unmodified polyethylene. It is further understood that the acid modified polyethylene itself may consist of blends of different polyethylene resins grafted together during the graft modification process or blends of different graft modified polyethylenes.

The styrene-based elastomer comprises 15 to 45 percent by weight of the adhesive composition. The styrene elastomer is a monovinyl aromatic hydrocarbon/olefin block copolymer elastomer having a linear or branched block structure. Styrene and alpha-methyl styrene are preferably used as monovinyl aromatic hydrocarbons with styrene being especially preferred. The olefin may be selected from conjugated di-olefins, such as butadiene and isoprene, and alpha-olefins, such as ethylene, propylene and 1-butene. The polymer block formed by polymerization of a conjugated di-olefin may be fully or partially hydrogenated. The amount of monovinyl aromatic hydrocarbon polymer blocks is generally 5 to 55 weight percent of the elastomer. The preferred polymer blocks have a monovinyl aromatic hydrocarbon selected from styrene with a relative weight percentage in the elastomer of 10 to 50 percent. The styrene-based elastomers have a melt index range, as measured by ASTM D1238 condition G, of 0.001 to 100. The styrene based elastomers utilized in the composition of the claimed invention have Mooney viscosities which are immeasurable under the conditions specified in, for example, U.S. Pat. No. 4,058,647. The conditions specified therein were conducted under ML 1+4 at 100° C. and were measurable and provided Mooney viscosities in the range of 40–150. Under the identical testing conditions at 100° C., the styrene based elastomers utilized herein were immeasurable. This result clearly shows that the styrene based elastomers disclosed in U.S. Pat. No. 4,058,647 are not similar to those utilized in the present invention. Some of the elastomers recited herein as part of the claimed composition and multilayer structures have measurable Mooney viscosities at higher temperatures than 100° C.-e.g., at greater than 110° C. (i.e., 121° C.) or greater than 140° C. (i.e., 150° C.). Without being bound hereto, it is thought that styrene based elastomers having a Mooney viscosity range of 2 to 200 at ML 1+4 150° C. are suitable in the claimed compositions and multilayer structures. It is believed that this class of elastomers in combination with the other components of the adhesive composition provides a unique and surprising balance of properties that enhances the adhesion properties to, for example, polypropylene based multilayer structures. These uncured elastomers also have a heat of fusion based upon Differential Scanning Calorimetry DSC of below 25 J/gm.

These styrene-based elastomers are commercially available under the trade names KRAYTON® T, D and 0 from Shell, BUNAT BL® from Bayer and STERON® from Firestone Corp. KRAYTON® G1652 provided a Mooney viscosity of about 100 at ML 1+4 at 150° C. (immeasurable at 100° C. or at 121° C. and STEREON® 840A had a Mooney viscosity of 47 at ML 1+4 121° C. This data supports the recitation of Moonies of 2 to 200 at ML 1+4 150° C.

The term "adhesive composition" means that the composition is claimed as and utilized as an adhesive for adhesive purposes and has such meaning when used in the preamble of the appended claims:

The term "incompatible barrier or structural layer" means a composite structure or structure comprising the layers A/B/C wherein layers A, B and C are comprised of different olefinic or non-olefinic material. Of course, the adhesive compositions recited herein can also bind A/B and B/C.

The term "compatible layer" means a composite structure such as PP/EVOH/PP or PP/nylon/PP wherein the adhesive is useful in bonding together multilayer structures having A/B/A type structures.

The terms "polar" and "non-polar" are given their ordinary meaning in that, for example, polyolefins are typically hydrocarbons which are described as relatively non-polar compared to polar polymers which have functionality such as carboxyl groups etc. or compared to metals such as aluminum or aluminum film. Polyamides, EVOH and ethylene copolymers such as ethylene/methacrylic acid or ethylene/acrylic acid or ionomers thereof represent relatively polar polymers relative to polyethylene or polypropylene or ethylene/alpha-olefin copolymers.

The term "structural layer" generally suggests that the layer provides some structural integrity to the final product or container or package but the layer, depending upon the polymeric material it is made from, can also have barrier properties to water or air.

The term "barrier layer" generally suggests that the layer has barrier properties (either keeping something out or in) and generally refers to liquids, aqueous-based solutions and/or gases such as oxygen. Of course, said layer can also provide some structural integrity to the fabricated structure.

The term "polypropylene" means homopolymers or copolymers of propylene. Copolymers of propylene may be in the form of random copolymers, where small amounts of ethylene (typically 2–8 wt. %) are incorporated randomly into the polypropylene backbone.

The term "polyamide" means condensation homopolymers or copolymers of diacids and diamines or lactams. The polyamides may be aliphatic or semi-aromatic in character. Some examples of typical aliphatic polyamides are nylon 6 made from caprolactam, nylon 6/12 copolymerized from caprolactam and laurolactam, nylon 66 homopolymerized from hexamethylene diamine and adipic acid. Polyamides necessary to form barrier layers are available from many commercial suppliers including BASF, Bayer, E. I. du Pont de Nemours and Company and EMS, among others.

The term "EVOH" means copolymers of ethylene and vinyl alcohol where the typical levels of ethylene vary from 27 to 48 mole percent. The commercial suppliers of EVOH are Evalca and Kuraray or Nippon Gohsei.

Other terms as recited herein are described below.

The adhesives are particular useful in adhering said plurality of layers in fabricated parts/structures such as bottles, containers etc. which demand structural integrity for the ultimate intended use. These structures are used to keep moisture out and to keep oxygen and other gases out and to keep the contents on the package or container moisture or gas free.

The adhesive compositions are prepared by dry blending the ingredients together in a polyethylene bag and subsequently melt blending in a 30 mm Werner Pfleiderer twin screw extruder or similar piece of equipment. The melt temperature is typically 225 to 250° C. Of course, other processing conditions may be used to form the adhesive compositions and multilayer structures having said adhesive compositions depending upon the available processing equipment, quantities needed and the particular excipients etc.

The adhesive compositions may be coextruded between a layer of, for example, Sclair® 19A, a conventional HDPE of MI 0.75 g/10 minutes and a layer of Fina® 3365, a polypropylene homopolymer of MFI 3 g/10 minutes. The adhesives are then melted at about 200° C. in a 25 mm single screw extruder operating at about 15 rpm. This temperature range can vary. The HDPE is melted at about 210° C. in a 25 mm single screw extruder operating at 63 rpm. Other polyethylenes may be melted at a suitable temperature. The PP is melted at about 206° C. in a 25 mm single screw extruder operating at 43 rpm. This temperature range can vary depending upon the particular polypropylene. All three melt streams are fed through a Brampton coextrusion blown film die or similar device so as to form a three-layer film with the HDPE at 51 microns, the PP at 46 microns each mad the tie layer at 15 microns. Of course, the thickness of the individual layers can vary depending upon the desired multilayered structure and use thereof. The die temperature is about 215° C. but can also vary. The blowup ratio of the blown film, defined as the lay flat width of the film bubble divided by the diameter of the die opening, is about 3.25 but can also vary. The film is run at about 3 meters/minute through the take-up rolls but, again, this rate can vary depending upon the particular equipment used and the embodiments manufactured.

The multilayer structures so prepared are evaluated by measuring their peel strengths using ASTM D- 1876-72, except that the test uses four to five duplicates of each sample rather than the specified 10. The test speed is 0.305 meters/minute (12 inches/minute). Of course, the fabricator can evaluate the structures and peel strengths by any suitable means.

Multilayer structures within the scope of the invention may be prepared by various processes including coextrusion cast film and sheet, coextrusion blown film, coextrusion blow molding, coextrusion or extrusion lamination, coextrusion or extrusion coating thermal lamination, solid phase or melt phase thermoforming of cast sheet or coextrusion tube. The temperature of the bonding resin composition during coextrusion or extrusion may be in the range of 110–300° C., but is preferably in the range of 130–280° C. The various structural and barrier resins should be processed at suitable temperatures above their melting temperatures or glass transition temperatures, if noncrystalline, but below their decomposition temperature to ensure good melt flowability.

The thickness of the various layers in the multilayer structures will vary according to its application and use. As an example, in blown film and case films, each adhesive layer may typically be between 2 to 10% by volume of the film. The barrier layer may typically be between 5 to 15% by volume of the film, depending upon the barrier requirements of the application. If the adhesive or barrier layer also serve additional functions, such as providing toughness or thermoformability or structural integrity or as a bulking layer, then the layer thickness or volume may be substantially more than the ranges mentioned above.

Various combinations of layers of (a) polypropylene; (b) bonding resin; (c) barrier resin and (d) ethylene homo and copolymers and ethylene ionomers are within the scope of the invention. Examples include a/b/c, a/b/d, a/b/c/b/c, a/b/c/c/c, a/b/c/b/d, a/b/c/b/a, a/b/c/b/c/b/a, a/b/c/b/c/b/d, a/b/c/c/b/a, a/b/c/c/b/d etc. The composite structures may include more than one type of barrier layer as illustrated above. They can also include regrind layers, where the regrind is ground up scrap of multilayer structures similar to the structure being made, and fed back into the structure as a separate layer.

Adhesive compositions of this invention can be used in composite structures containing polar substrates such as nylon, ethylene vinyl alcohol copolymers (EVOH), polyvinyl alcohol, polyesters and metal foils. These multilayer structures can be just two layers or they can be three or more layers. For instance, polyolefins, such as polyethylene homo- and copolymers, ionomers, ethylene acids, ethylene vinyl acetates, ethylene acrylates, polypropylene homo and copolymers, can be used in these layers. The adhesive compositions are particularly useful in composite structures where both polyethylenes, ionomers or ethylene acids are present with propylene polymers.

Other multilayer structures are prepared by coextruding between a layer of Fina® 3365, a propylene homopolymer of MFI 3 g/10 minutes, and a layer of Surlyn® 1601. Surlyn® 1601 is an ethylene ionomer from DuPont with a melt index of 1.7. This resin is an ethylene copolymer having 10 weight percent methacrylic acid which is neutralized with sodium. Other suitable ethylene copolymers as at least one of the layers in a multilayer structure having at least one ethylene copolymer layer, at least one adhesive layer and at least one polypropylene layer include those resins commercially available from E. I. du Pont de Nemours and Company. These ethylene copolymers generally comprise ethylene and at least one copolymer selected from an acrylic or methacrylic acid. An additional softening monomer can be present and is generally selected from a $C_1$–$C_8$ alkyl acrylate or methacrylate. The acid functional group on the copolymer can be neutralized with a cation selected from sodium, zinc, magnesium, or lithium or mixtures of these metals. The relative weight percentage of the acid group can vary from about 8 to 40 percent and the relative percentage of the ester moiety, if present, can vary from 1 to about 40 percent with preferred percentages in the range of 10 to 30 percent. The extent of acid neutralization of the acid groups can vary from 0 to 100%. When there are at least three non-adhesive layers in a multilayer structure, it is preferred that the at least two adhesive layers binding the three non-adhesive layers together is selected from the adhesive composition of the invention-e.g., the present invention preferably includes those multilayer structures having at least five(5) layers wherein the at least two adhesive layers are selected from the same adhesive composition. Thus, the present invention provides an improved process or method for adhering incompatible layers by providing a single adhesive composition between said incompatible layers and wherein the adhesive is a polyethylene based adhesive versus a modified EVA or EMA based adhesive.

The adhesives are melted at about 210° C. in a 25 mm single screw extruder operating at about 13 rpm. The ionomer is melted at about 1 98° C. in a 25 mm single screw extruder operating at 43 rpm. The PP is melted at about 218° C. in a 25 mm single screw extruder operating at 89 rpm. Of course, other processing conditions and equipment may be utilized. All three melt streams are fed through a Brampton coextrusion blown film die so as to form a three-layer film with the ionomer layer at about 38 microns, the PP at about 50 microns each and the tie layer at about 14 microns. The die temperature is about 220° C. As indicated above, the temperatures and operating conditions and widths of layers can vary depending upon various factors.

Of course, multilayer structures having at least three non-adhesive layers can readily be formed using additional melt streams or by lamination techniques. The following examples demonstrate the advantages and properties of the recited adhesive compositions and further demonstrate the preparation and properties of multilayer structures claimed herein.

In the following examples, the test methods listed and described below were utilized:

Peel strength was measured using ASTM D1876-72. Prior to evaluating bond strengths of the laminates, the laminates were conditioned for at least 24 hours at 25° C. at 50% relative humidity. Peel strength was evaluated according to the above ASTM method by separating the film at the weakest interface, and testing on an Instron tester in the (T) peel configuration, at 30 cm/min (12 inches/minute) separation rate. The average value of at least three, more typically 5, specimens was recorded as the peel strength of the sample. The examples below relative to the comparative examples show relative good or inadequate peel strengths.

Melt index is measured according to ASTM D1238 (190° C./2.16kg) unless otherwise noted. For the styrene elastomers, the melt index is measured according to ASTM D1238 (200° C./5.0 kg), sometimes known as condition G. For the metallocene ethylene polymers, the melt flow ratio I- 10/I-2 and molecular weight distribution were measured as described in U.S. Pat. No. 5,278,272.

Mooney viscosities are measured according to ASTM D 1646 which is the standard viscosity test for styrene rubbers. Under low temperature conditions (100° C. or less) as specified in U.S. Pat. No. 4,058,647, the elastomers utilized in the present invention could not be measured. In order to begin to obtain measurable Moonies for the styrene based elastomers utilized herein, the temperature had to be raised to greater than 110° C. as stated above. It is believed that the elastomers utilized in the present invention have higher molecular mass than those materials described in U.S. Pat. No. 4,058,647. Thus, the present invention is directed to those adhesive compositions and multilayer structures having styrene based elastomers with high-molecular mass which means those elastomers which have immeasurable Moonies at ML 1+4 100° C. or less.

EXAMPLES

The adhesive compositions in the following examples were prepared by dry blending the ingredients together in a polyethylene bag and subsequently melt blending in a 30 mm Werner Pfleiderer twin screw extruder. The melt temperature was typically 225 to 250° C.

The adhesive compositions were coextruded between a layer of Sclair® 19A, a conventional HDPE of MI 0.75 g/10 minutes and a layer of Fina® 3365, a polypropylene homopolymer of MFI 3 g/10 minutes The adhesives were melted at 200° C. in a 25 mm single screw extruder operating at about 15 rpm. The HDPE was melted at 210° C. in a 25 mm single screw extruder operating at 63 rpm. The PP was melted at 206° C. in a 25 mm single screw extruder operating at 43 rpm. All three melt streams were fed through a Brampton coextrusion blown film die so as to form a three-layer film with the HDPE at 51 microns, the PP at 46 microns each and the tie layer at 15 microns. The die temperature was 215° C. The blowup ratio of the blown film, defined as the lay flat width of the film bubble divided by the diameter Or the die opening, was 3.25. The film was run at about 3 meters/minute through the take-up rolls.

The data shown in Table 2 illustrates the invention. The first six columns are the components of the adhesive compositions of the invention. Detailed descriptions of the components are given in Table 1. The examples in this table all peeled at or near the interface between the adhesive layer and the polypropylene layer. Comparative example C1, differing only from Example 10 in the elastomer type, clearly does not possess as high a peel strength as Example 10, which contains the elastomer described by the invention. Comparative examples C2, C3 and C4 show that in utilizing VLDPE in place of an elastomer, such as EPDM in C1, the peel performance of the adhesives to polypropylene does not improve to the same degree as for Examples 1 through 10. Example 7 is identical to Example 10, except that it has a different unmodified PE, and shows excellent peel performance. Examples 1 and 2 show that high peel strength is obtained compared to C1, when different levels of the styrene elastomer is used. Examples 3 through 6, 9 and 10 show the range of compositions of the invention in that different types of modified polyethylene and different levels of the modified polyethylene are used, all with outstanding bond strength performance.

The adhesive compositions in Table 3 were made in a similar manner as those in Table 2. They were coextruded between a layer of Fina® 3365, a propylene homopolymer of MFI 3 g/10 minutes, and a layer of Surlyn® 1601. Surlyn® 1601 is an ethylene ionomer from DuPont with a melt index of 1.7. The adhesives were melted at 210° C. in a 25 mm single screw extruder operating at about 13 rpm. The ionomer was melted at 198° C. in a 25 mm single screw extruder operating at 43 rpm. The PP was melted at 218° C. in a 25 mm single screw extruder operating at 89 rpm. All three melt streams were fed through a Brampton coextrusion blown film die so as to form a three-layer film with the ionomer layer at 38 microns, the PP at 50 microns each and the tie layer at 14 microns. The die temperature was 220° C. The blow up ratio of the blown film, defined as the lay flat width of the film bubble divided by the diameter of the die opening, was 3.25. The film was run at about 3.8 meters/minute through the take-up rolls.

The data in Table 3 illustrate the invention. The first six columns are the components of the adhesive compositions of the invention. Detailed descriptions of the components are given in Table 1. Comparative Examples 5, 6 and 7 contain varying amounts of an EPDM elastomer, yet provide poor peel strength values compared to Examples 11 through 30, which contain varying amounts of acid modified graft polymer and varying levels of the styrene-based elastomer of this invention. Comparative Examples 8 and 9 show that in utilizing VLDPE in place of an elastomer such as EPDM in C1, the peel performance of the adhesives is not improved to the same degree as Examples 11 and 16, the closest examples to these two comparative examples. In fact, as can be seen from comparative Example C10, which contains predominantly VLDPE, peel strengths are inferior to a less expensive adhesive composition containing predominantly LLDPE, such as Examples 11, 22 or 23.

TABLE 1

| Code | Composition | Density | MI |
|---|---|---|---|
| LL1 | Conventional LLDPE, butene | 0.924 | 5 |
| LL2 | Conventional LLDPE, octene | 0.919 | 6 |
| LL3 | Conventional LLDPE, butene | 0.920 | 1.4 |
| LL4 | Conventional LLDPE, butene | 0.921 | 12 |
| LD1 | LDPE (free radical) | 0.915 | 15 |
| VL1 | Conventional VLDPE, butene | 0.884 | 0.8 |
| VL2 | Metallocene VLDPE, octene I-10/I-2 = 6.80 Mw/Mn = 2 | 0.870 | 1 |
| VL3 | Metallocene VLDPE, butene I-10/I-2 = 5.89 Mw/Mn = 2 | 0.878 | 3 |
| VL4 | Metallocene VLDPE, butene I-10/I-2 < 6.53 Mw/Mn = 2 | 0.900 | 3.5 |
| G1 | Grafted conventional HDPE, 0.9 w % Manh | 0.959 | 2 |
| G2 | Grafted conventional butene LLDPE, 0.9 w % Manh | 0.920 | 2 |
| G3 | Grafted metallocene hexene LLDPE, 0.9 w % Manh, *I-10/I-2 = 5.84, Mw/Mn = 2.4 | 0.918 | 2.7 |
| EL-4 | Styrene ethylene butylene styrene block copolymer, 29% styrene | 0.91 | 10** |
| EL-1 | Conventional ethylene propylene diene | ~0.87 | TH |
| EL-2 | Metallocene ethylene propylene diene | ~0.87 | TH |
| EL-3 | Styrene butadiene copolymer, 44% styrene | 0.96 | 11.5** |

Note: The density of the grafted resins reflects the density of the resin before grafting.
*Measured on the base resin before graft modification
**Melt index measured at 200° C./5 kg condition G of ASTM D1238

TABLE 2

| EX | Unmodified Polyethylene | | Grafted Polyethylene | | Elastomer | | Peel Strength |
|---|---|---|---|---|---|---|---|
| | Code | Wt % | Code | Wt % | Code | Wt % | Gram/25 mm |
| C1 | LL1 | 58 | G1 | 12 | EL-1 | 30 | 161 ± 33 |
| C2 | LL3 | 24 | G2 | 35 | EL-1 | 18 | 330 ± 110 |
|  | LD1 | 10 | | | | | |
|  | VL1 | 13 | | | | | |
| C3 | LL4 | 44 | G1 | 15 | | | 185 ± 40 |
|  | LL1 | 14 | | | | | |
|  | VL3 | 30 | | | | | |
| C4 | LL1 | 58 | G1 | 12 | | | 531 ± 232 |
|  | VL2 | 30 | | | | | |
| 1 | LL1 | 48 | G1 | 12 | EL-3 | 40 | 1176 ± 264 |
| 2 | LL1 | 68 | G1 | 12 | EL-3 | 20 | 344 ± 51 |
| 3 | LL1 | 68 | G1/G2 | 6/6 | EL-3 | 20 | 1427 ± 334 |
| 4 | LL1 | 58 | G1/G2 | 6/6 | EL-3 | 30 | 636 ± 31 |
| 5 | LL1 | 68 | G2 | 12 | EL-3 | 20 | 402 ± 33 |
| 6 | LL1 | 58 | G2 | 12 | EL-3 | 30 | 790 ± 44 |
| 7 | LL3 | 58 | G1 | 12 | EL-3 | 30 | 1706 ± 234 |
| 8 | LL3 | 30 | G1 | 40 | EL-3 | 30 | 1859 ± 81 |
| 9 | LL3 | 30 | G3 | 40 | EL-3 | 36 | 1685 ± 475 |
| 10 | LL1 | 58 | G3 | 12 | EL-3 | 30 | 1067 ± 428 |

TABLE 3

| Ex | Unmodified Polyethylene | | Grafted Polyethylene | | Elastomer | | Peel Strength |
|---|---|---|---|---|---|---|---|
| | Code | Wt % | Code | Wt % | Code | Wt % | Gram/25 mm |
| C5 | LL1 | 58 | G1 | 12 | EL-1 | 30 | 238 ± 34 |
| C6 | LL3 | 24 | G2 | 35 | EL-1 | 18 | 210 ± 40 |
|  | LD1 | 10 | | | | | |
|  | VL1 | 13 | | | | | |
| C7 | LL3 | 35 | G3 | 15 | EL-2 | 23 | 154 ± 22 |
|  | LL2 | 22 | | | | | |
|  | LD1 | 5 | | | | | |
| C8 | LL1 | 58 | G1 | 12 | | | 802 ± 314 |
|  | VL2 | 30 | | | | | |

TABLE 3-continued

| Ex | Unmodified Polyethylene Code | Wt % | Grafted Polyethylene Code | Wt % | Elastomer Code | Wt % | Peel Strength Gram/25 mm |
|---|---|---|---|---|---|---|---|
| C9 | LL4 | 44 | G2 | 15 | | | 166 ± 37 |
| | LL1 | 14 | | | | | |
| | VL3 | 30 | | | | | |
| C10 | VL1 | 40 | G2 | 15 | | | 201 ± 37 |
| | VL3 | 25 | | | | | |
| | LD1 | 20 | | | | | |
| C11 | LL1 | 78 | G3 | 12 | EL-4 | 10 | 196 (+/−) 14 |
| 11 | LL3 | 58 | G1 | 12 | EL-3 | 30 | 949 ± 49 |
| 12 | LL1 | 68 | G3 | 12 | EL-3 | 20 | 316 ± 57 |
| 13 | LL1 | 58 | G3 | 12 | EL-3 | 30 | 1089 ± 158 |
| 14 | LL3 | 30 | G3 | 40 | EL-3 | 30 | 834 ± 44 |
| 15 | LL1 | 68 | G2 | 12 | EL-3 | 20 | 574 ± 183 |
| 16 | LL1 | 58 | G2 | 12 | EL-3 | 30 | 1240 ± 132 |
| 17 | LL3 | 30 | G2 | 40 | EL-3 | 30 | 678 ± 45 |
| 18 | LL1 | 68 | G1/G2 | 6/6 | EL-3 | 20 | 290 ± 29 |
| 19 | LL1 | 58 | G1/G2 | 6/6 | EL-3 | 30 | 1115 ± 101 |
| 20 | LL1 | 48 | G1 | 12 | EL-3 | 40 | 970 ± 71 |
| 21 | LL1 | 68 | G1 | 12 | EL-3 | 20 | 403 ± 60 |
| 22 | LL3 | 50 | G2 | 15 | EL-3 | 35 | 1143 ± 155 |
| 23 | LL3 | 50 | G3 | 15 | EL-3 | 35 | 1064 ± 77 |
| 24 | LL1 | 46 | G3 | 12 | EL-3 | 32 | 1242 +/− 93 |
| | LD1 | 10 | | | | | |
| 25 | LL1 | 68 | G3 | 12 | EL-4 | 20 | 897 +/− 78 |
| 26 | LL1 | 58 | G3 | 12 | EL-4 | 30 | 1040 +/− 22 |
| 27 | VL4 | 58 | G1 | 12 | EL-3 | 30 | 1049 +/− 34 |
| 28 | VL2 | 55 | G1 | 15 | EL-3 | 30 | 1092 +/− 32 |
| 29 | VL1 | 55 | G1 | 15 | EL-3 | 30 | 639 +/− 84 |
| 30 | LL1 | 56 | G3 | 12 | EL-3 | 32 | 1001 +/− 61 |

Comparative Example 11 shows that when the styrene elastomer is below about 15% (10% or below), the adhesive composition does not provide good peel strength. In contrast, Examples 25 and 26 which are identical in composition to Comparative example 11, except that the styrene elastomer is above about 15%, demonstrate good peel strength. Comparative Example 10 can also be further compared to Examples 27–29 in that all contain as the unmodified polyethylene very low density polyethylenes of various kinds, yet Examples 27–29, unlike Comparative example 10, show superior performance.

What is claimed is:

1. An adhesive composition, consisting essentially of A) plus B),
wherein
   A) is about 55 to 85 wt. % of a polyethylene polymeric blend selected from
      i) an unmodified polyethylene of density 0.86 to 0.97 g/cc; and
      ii) a polyethylene of density 0.86 to 0.97 g/cc modified with an unsaturated carboxylic acid or derivative thereof; wherein the amount of said unsaturated carboxylic acid or its derivative lo comprises 0.01 to 3 wt. % of A) plus B) and
   B) is about 15 to 45 wt. % of an unmodified styrene-based elastomer having an immeasurable Mooney viscosity according to ASTM-D-15 or ASTM D1646 at ML 1+4 100° C.

2. An adhesive composition, consisting essentially of,
   A) about 55 to 85 wt. % of a polyethylene polymeric blend selected from
      i) an unmodified polyethylene of density 0.86 to 0.97 g/cc with the proviso that an unmodified ethylene-alpha olefin within said polyethylene has a density of 0.91 to 0.97; and
      ii) a polyethylene of density 0.86 to 0.97 g/cc modified with an unsaturated carboxylic acid or derivative thereof; and
   B) about 15 to 45 wt. % of an unmodified styrene-based elastomer wherein said composition binds incompatible structural or barrier layers in a multilayer structural element having at least three structural/barrier layers and wherein the Mooney viscosity of the styrene-based elastomer is, at ML 1+4 150° C., 2–200 according to ASTM D1646.

3. The adhesive composition according to claim 1 or 2 wherein the amount of unsaturated carboxylic acid or derivative thereof is 0.03 to 2 wt. % relative to the total weight of A) plus B).

4. The adhesive composition according to claim 1 or 2 wherein the wt. % of the styrene-based elastomer is 20 to 40%.

5. The adhesive composition according to claim 1 or 2 wherein the density range for the unmodified polyethylene ranges from 0.92 to 0.93 g/cc and the density range of the modified polyethylene ranges from 0.90 to 0.96 g/cc.

6. The adhesive composition according to claim 1 or 2 wherein the unmodified polyethylene or polyethylene to be modified is selected from a metallocene produced resin.

7. The adhesive composition according to claim 1 wherein the Mooney viscosity of the styrene-based elastomer is, at ML 1+4 150° C., 2–200 according to ASTM D1646.

8. A multilayer composite structure having at least two structural and/or barrier layers wherein the adhesive composition according to claim 1 or 2 binds said layers.

9. A multilayer composite structure according to claim 8 wherein at least one of the structural layers is polypropylene.

10. A multilayer composite structure according to claim 9 wherein at least one of the barrier layers is selected from EVOH, polyamide or a combination of EVOH and polyamide.

11. A multilayer composite structure according to claim 9 or 10 wherein an additional structural layer is selected from polyethylene, or an ethylene acid copolymer or an ethylene acid ionomer or polypropylene.

12. A multilayer composite structure according to claim 11 wherein the polyethylene is a metallocene based resin.

13. A multilayer composite structure, comprising
   a) a polypropylene layer;
   b) an adhesive layer wherein the composition of said layer consists essentially of A) plus B), wherein:
      A) is about 55 to 85 wt. % of a polymeric blend consisting essentially of
         i) an unmodified polyethylene having a density of 0.86 to 0.97 g/cc and
         ii) a polyethylene having a density of 0.86 to 0.97 g/cc modified with an unsaturated carboxylic acid or a derivative thereof, wherein the amount of said carboxylic acid or derivative thereof is 0.01 to 3 wt. % relative to A) plus B); and
      B) is about 15 to 45 wt. % of a styrene-based elastomer having an immeasurable Mooney viscosity at ML 1+4 100° C. according to ASTM-D15or ASTM D1646; and
   c) a polymeric layer wherein the polymeric constituents of said layer are selected from polyethylene, or an ethylene/acid copolymer or an ethylene/acid ionomer or a polypropylene.

14. A multilayer composite structure, comprising
   a) a first non-polar polymeric layer;
   b) an adhesive layer having the adhesive composition according to claim 1 or claim 2;
   c) a polar metallic or non-metallic layer;

d) an adhesive layer having the same composition as layer b); and e) a second non-polar polymeric layer wherein the second non-polar polymeric layer is different than the first non-polar polymeric layer.

15. The multilayer structure according to claim 14 wherein layer a) is selected from a polypropylene; layer c) is selected from a polyamide or EVOH; and layer e) is selected from a polyethylene or ethylene/acid copolymer or ionomer.

16. A multilayer composite structure according to claim 8 wherein the adhesive composition contains a metallocene polyethylene.

* * * * *